United States Patent
Richard

(10) Patent No.: US 6,182,931 B1
(45) Date of Patent: Feb. 6, 2001

(54) CHILD OBJECT SUPPORT SYSTEM

(76) Inventor: Lorraine Richard, 3000-93rd St. SE., Bismarck, ND (US) 58504

(*) Notice: Under 35 U.S.C. 154(b), the term of this patent shall be extended for 0 days.

(21) Appl. No.: 09/175,863

(22) Filed: Oct. 20, 1998

(51) Int. Cl.[7] .................................................. A47D 15/00
(52) U.S. Cl. .............................. 248/102; 297/182; 108/44
(58) Field of Search .................................... 248/102, 105, 248/106; 224/275; 108/44; 297/182, 188

(56) References Cited

U.S. PATENT DOCUMENTS

| | | | |
|---|---|---|---|
| D. 383,889 | * 9/1997 | Gallegos | D2/738 |
| 788,859 | * 5/1905 | Troy | 248/102 |
| 1,837,983 | * 12/1931 | Moran | 2/48 |
| 2,822,968 | * 2/1958 | Jackson | 224/275 |
| 3,014,759 | * 12/1961 | Bing | 224/275 |
| 4,770,107 | * 9/1988 | Miller | 108/44 |
| 5,163,694 | * 11/1992 | Reichek | 280/47.26 |
| 5,188,421 | * 2/1993 | Arseneault | 297/182 |
| 5,690,036 | * 11/1997 | Hasegawa | 108/25 |
| 5,878,672 | * 3/1999 | Ostermann et al. | 108/44 |
| 5,890,809 | * 4/1999 | Nelson | 383/40 |
| 5,960,471 | * 10/1999 | Burton | 2/48 |

* cited by examiner

Primary Examiner—Anita M. King
(74) Attorney, Agent, or Firm—Michael S. Neustel

(57) ABSTRACT

A child object support system for use within a vehicle to support a child's toys, bottles and other items within the child's reach during travel thereby reducing the chance of the child losing an item during travel. The inventive device includes a support member of a flexible material, a cup holder within the support member, a plurality of loops attached to the support member, a pocket attached to the support member, a front strap having a buckle attached to a front end of the support member, and a first rear strap, a second rear strap and a third rear strap having a pair of buckles attached to a rear end of the support member. The front strap is removable attachable about a head rest or a front seat of the vehicle. The first rear strap and the third rear strap are removable attachable to a car seat or a rear seat of the vehicle by the second rear strap. The support member is preferably angled downwardly toward the child within the car seat so as to retain the child's items within reach. The cup holder retains the child's bottle or cup. The plurality of loops and pocket retain miscellaneous objects and toys that the child plays with. A sheath is preferably included for assisting the user in positioning the second rear strap within the seat belt passageway of the car seat.

16 Claims, 4 Drawing Sheets

CHILD OBJECT SUPPORT SYSTEM

BACKGROUND OF THE INVENTION

1. Field of the Invention

The present invention relates generally to tray devices and more specifically it relates to a child object support system for use within a vehicle to support a child's toys, bottles and other items within the child's reach during travel thereby reducing the chance of the child losing an item during travel.

When a parent travels with their children, typically the children will be restrained within a car seat specially designed for their smaller size. The car seat is typically positioned in the rear seat for safety concerns and air bags that are common in the front seats of vehicles. Before the parent begins to operate the vehicle, typically they will give the child a cup, bottle and/or toy(s) to keep the child occupied during travel. However, often times the child will drop the cup, bottle and/or toy(s) during travel thereby making them unhappy and prone to cry. Sometimes the parent will attempt to reach back to pick up the lost item during travel that can be extremely dangerous for the parent and the child. If the parent cannot reach the lost item, or does not desire to take the risk of reaching rearwardly, the parent will sometimes continue to travel with the child unhappy and possibly attempting to get out of their car seat.

2. Description of the Prior Art

Tray devices have been in use for years. Typically, the tray will be positioned about the child or attached to the rear portion of the front seat. The trays that attach to the rear portion of the front seat will often have a pivotally attached tray that extends downwardly. The problem with these devices is that often times the items retained within them are out of reach of smaller children whose arms cannot reach them. The devices that attach around the child as an "apron" are undesirable since they limit the child's movements during travel.

Examples of tray and apron devices include U.S. Pat. No. 5,701,605 to Bowen; U.S. Pat. No. 4,466,659 to Carpentier et al; U.S. Pat. No. 5,457,820 to Yielding; U.S. Pat. No. 5,778,450 to Hagestad et al; U.S. Pat. No. 3,986,649 to Heimstra; U.S. Pat. No. 4,826,208 to Ozmar which are all illustrative of such prior art.

Bowen (U.S. Pat. No. 5,701,605) discloses an auto bib with integral tray portion. Bowen teaches a foldable and reusable bib that has a relatively flat stiff sheet with a fold portion. The problem with Bowen is that the stiff tray portion is uncomfortable for a child to have positioned about them. In addition, items on the tray portion can easily be bumped or rolled off out of reach of the child, thereby requiring the parent to reach back and retrieve the lost item.

Carpentier et al (U.S. Pat. No. 4,466,659) discloses a seat back mounted tray holder. Carpenteir et al teaches a folding tray holder that is removably attachable to a rear portion of a seat by a pair of opposing hook members. The problem with Carpentier et al is that the position of the items on the tray is completely dependent upon the position of the seat thereby still requiring the parent to reach back to assist the child in retrieving a specific item.

While these devices may be suitable for the particular purpose to which they address, they are not as suitable for use within a vehicle to support a child's toys, bottles and other items within the child's reach during travel thereby reducing the chance of the child losing an item during travel. Conventional tray devices can be uncomfortable for a child during travel. Also, conventional tray devices that are attached to a rear portion of a seat are positionally dependent upon the position of the seat they are attached to.

In these respects, the child object support system according to the present invention substantially departs from the conventional concepts and designs of the prior art, and in so doing provides an apparatus primarily developed for the purpose of supporting a child's toys, bottles and other items within the child's reach during travel thereby reducing the chance of the child losing an item during travel.

SUMMARY OF THE INVENTION

In view of the foregoing disadvantages inherent in the known types of tray devices now present in the prior art, the present invention provides a new child object support system construction wherein the same can be utilized for supporting a child's toys, bottles and other items within the child's reach during travel thereby reducing the chance of the child losing an item during travel.

The general purpose of the present invention, which will be described subsequently in greater detail, is to provide a new child object support system that has many of the advantages of the tray devices mentioned heretofore and many novel features that result in a new child object support system which is not anticipated, rendered obvious, suggested, or even implied by any of the prior art tray devices, either alone or in any combination thereof.

To attain this, the present invention generally comprises a support member of a flexible material, a cup holder within the support member, a plurality of loops attached to the support member, a pocket attached to the support member, a front strap having a buckle attached to a front end of the support member, and a first rear strap, a second rear strap and a third rear strap having a pair of buckles attached to a rear end of the support member. The front strap is removable attachable about a head rest or a front seat of the vehicle. The first rear strap and the third rear strap are removable attachable to a car seat or a rear seat of the vehicle by the second rear strap. The support member is preferably angled downwardly toward the child within the car seat so as to retain the child's items within reach. The cup holder retains the child's bottle or cup. The plurality of loops and pocket retain miscellaneous objects and toys that the child plays with. A sheath is preferably included for assisting the user in positioning the second rear strap within the seat belt passageway of the car seat.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be understood that the phraseology and terminology employed herein are for the purpose of the description and should not be regarded as limiting.

A primary object of the present invention is to provide a child object support system that will overcome the shortcomings of the prior art devices.

Another object is to provide a child object support system that supports a child's items during vehicle travel within their reach.

An additional object is to provide a child object support system that is not dependent upon the position of the front or rear seats.

A further object is to provide a child object support system that reduces the chance of the items rolling away from the child.

Another object is to provide a child object support system that can also be utilized to store the child's items during non-travel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
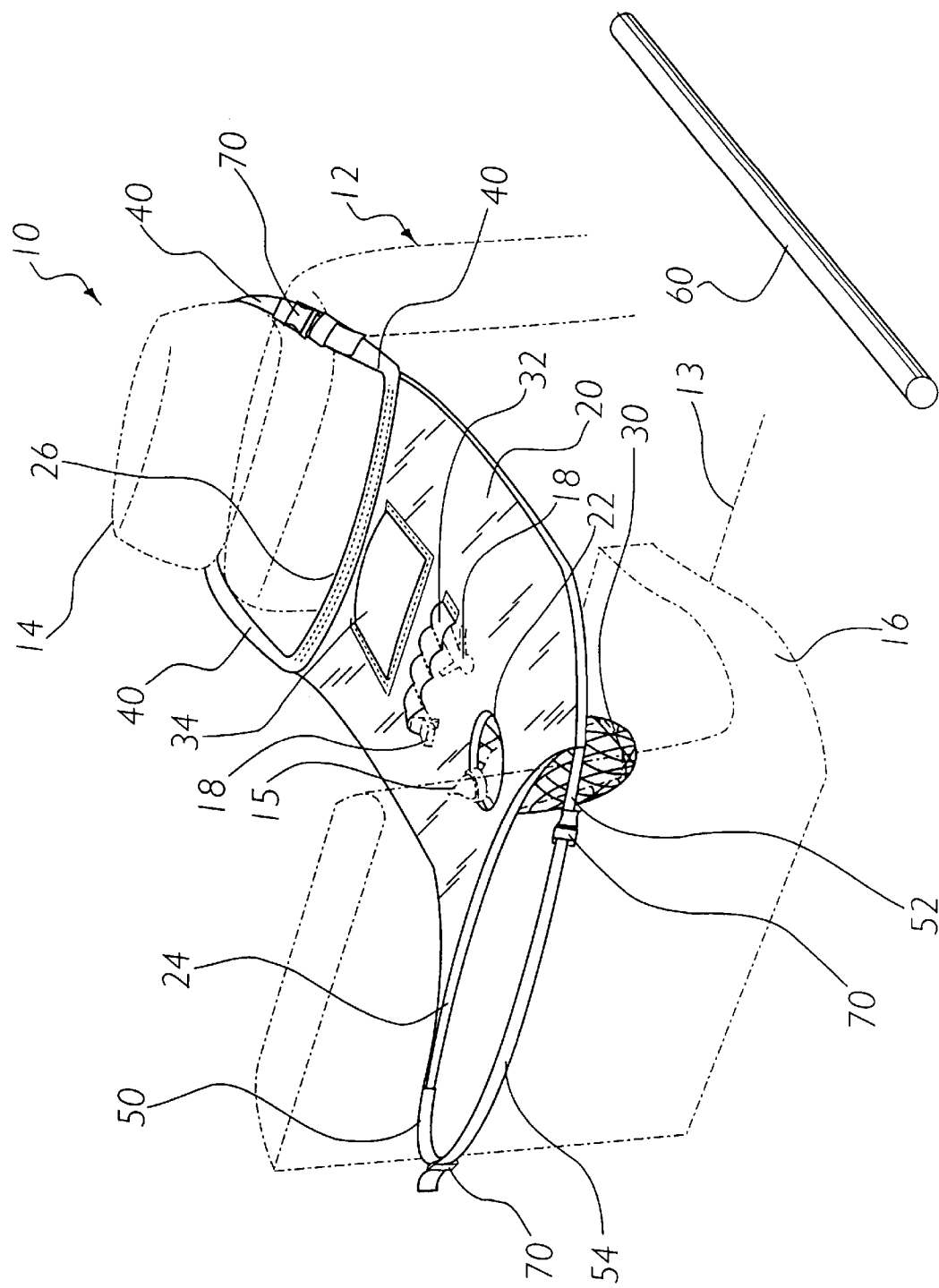
FIG. 1 is an upper perspective view of the present invention attached between the car seat and the front seat.

Turning now descriptively to the drawings, in which similar reference characters denote similar elements throughout the several view, FIGS. 1 through 4 illustrate a child object support system 10, which comprises a support member 20 of a flexible material, a cup holder 30 within the support member 20, a plurality of loops 32 attached to the support member 20, a pocket 34 attached to the support member 20, a front strap 40 having a buckle 70 attached to a front end 26 of the support member 20, and a first rear strap 50, a second rear strap 52 and a third rear strap 54 having a pair of buckles 70 attached to a rear end 24 of the support member 20. The front strap 40 is removable attachable about a head rest 14 or a front seat 12 of the vehicle. The first rear strap 50 and the third rear strap 54 are removable attachable to a car seat 16 or a rear seat 13 of the vehicle by the second rear strap 52. The support member 20 is preferably angled downwardly toward the child 19 within the car seat 16 so as to retain the child's items within reach. The cup holder 30 retains the child's bottle 15 or cup. The plurality of loops 32 and pocket 34 retain miscellaneous objects and toys 18 that the child 19 plays with. A sheath 60 is preferably included for assisting the user in positioning the second rear strap 52 within the seat belt passageway of the car seat 16.

Figure 3:
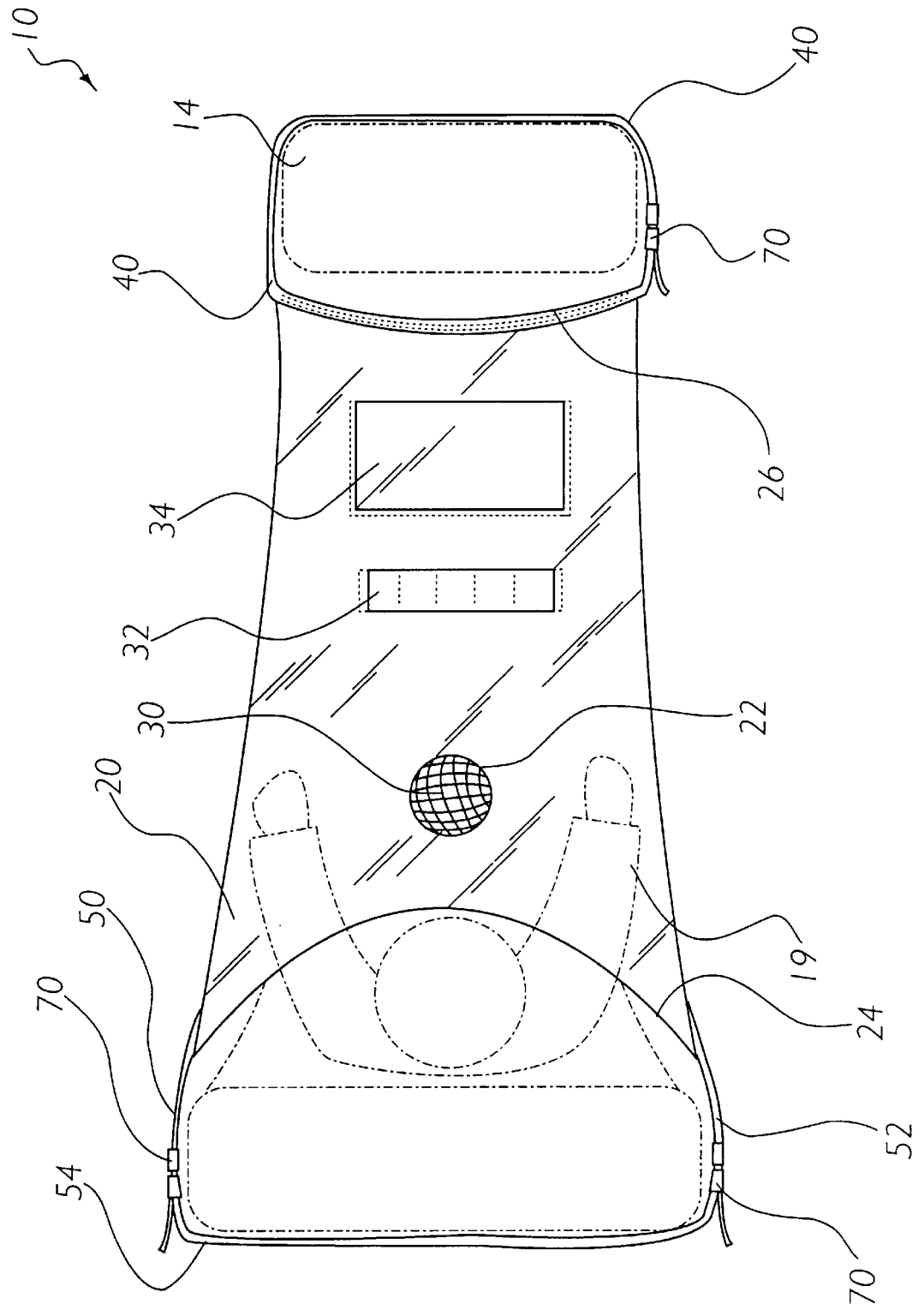
FIG. 3 is a top view of the present invention attached between the car seat and the front seat.

As best shown in FIGS. 1 and 3 of the figures, the support member 20 is preferably of an elongate rectangular shape. However, it can be appreciated that various other shapes may be utilized for the support member 20. The support member 20 supports the items within reach of the child 19 in a car seat 16 such as a bottle 15, toy 18 or other miscellaneous items. The support member 20 is preferably comprised of a flexible material. The support member 20 is preferably impermeable to liquids, however it can be appreciated that semi-permeable and permeable material may be utilized. The support member 20 is preferably comprised of a cloth like material, however it can be appreciated by one skilled in the art that various other materials may be utilized such as tarp, netting or plastic. The support member 20 may also be comprised of an elastic material or non-elastic material. The support member 20 has a rear end 24 and a front end 26 as best shown in FIG. 3 of the drawings.

Figure 2:
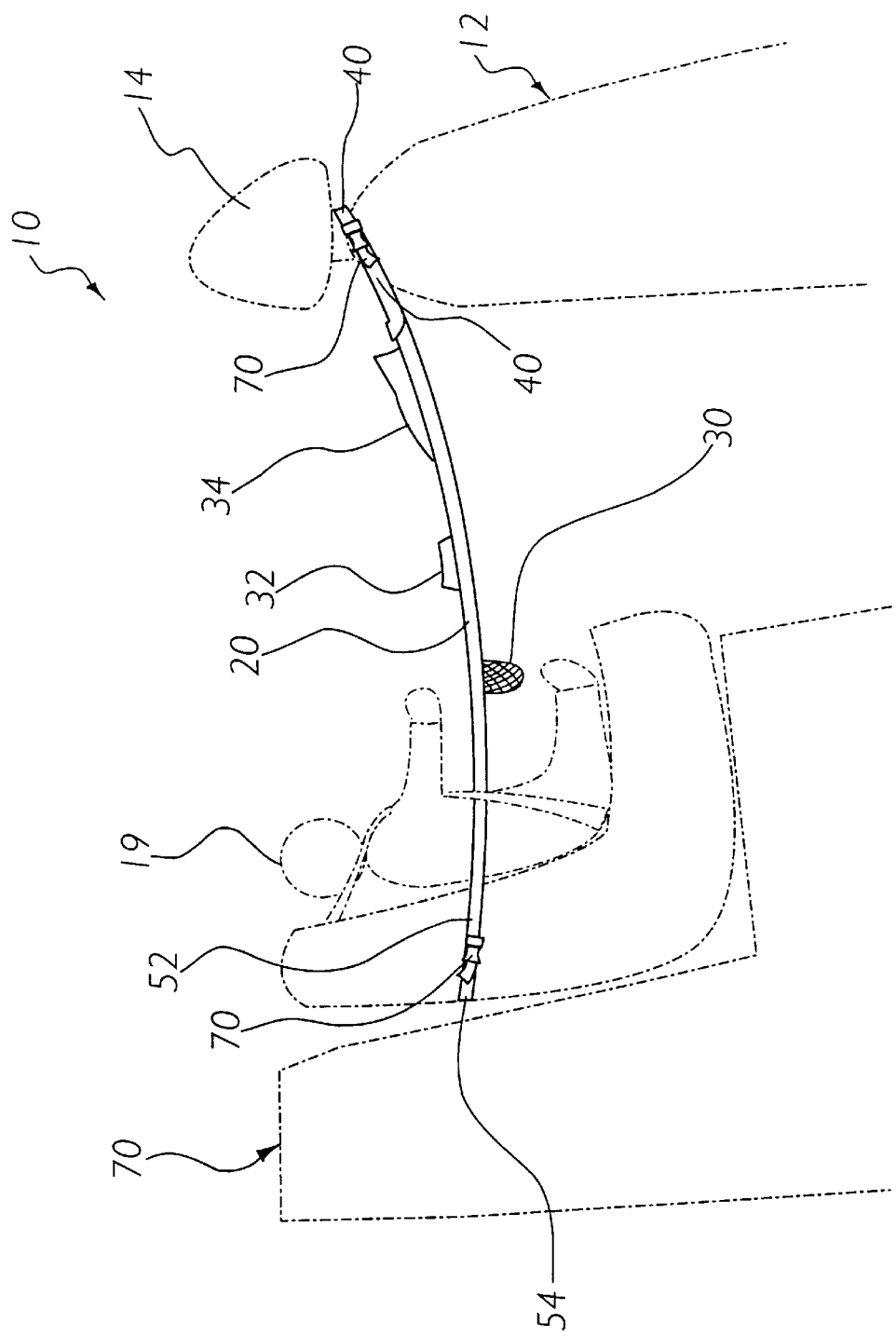
FIG. 2 is a side view of the present invention attached between the car seat and the front seat.

As best shown in FIGS. 1 and 3 of the drawings, the support member 20 includes an aperture 22 near the rear end 24 for removably receiving a bottle 15 or a cup. A cup holder 30 is attached about the aperture 22 to the bottom surface of the support member 20 for removably capturing the bottle 15 or cup as best shown in FIGS. 1 and 2 of the drawings. The cup is preferably comprised of a netting material to prevent accumulation of spills, however various other materials may be utilized as can be appreciated.

As best shown in FIGS. 1 and 3 of the drawings, a plurality of loops 32 are attached to a central portion of the support member 20 for retaining miscellaneous objects. The loops 32 are preferably constructed of an elastic material to allow reception of various sizes of objects. As further shown in FIGS. 1 and 3 of the drawings, at least one pocket 34 is attached to the top surface of the support member 20 for retaining other objects and toys 18 for the child 19. The pocket 34 preferably faces the front end 26 of the support member 20. The pocket 34 and loops 32 may be attached to the support member 20 by conventional attaching means such as sewing, riveting or gluing.

As best shown in FIGS. 1 through 3 of the drawings, a front strap 40 is preferably attached along the front end 26 of the support member 20. A buckle 70 is attached to the front strap 40 for allowing the user to removably attach the front strap 40 about the head rest 14 or a front seat 12 as shown in FIGS. 1 and 2 of the drawings. As can be appreciated, the front strap 40 is adjustably attached to the buckle 70 for allowing adjustment for various sizes of head rests 14 and front seats 12. It can also be appreciated that more than one strap may be utilized to comprise the front strap 40.

Because the front strap 40 is attached to the front end 26 of the support member 20, the front strap 40 extends outwardly from the support member 20 traversely to a longitudinal axis of the support member 20 as best shown in FIG. 3 of the drawings. This allows the user to roll the front end 26 of the support member 20 to shorten the overall length of the support member 20 if the front seat 12 should be positioned relatively close to the car seat 16.

As best shown in FIGS. 1 and 3 of the drawings, a first rear strap 50 and a second rear strap 52 are preferably attached to opposing sides of the rear end 24 of the support member 20. A pair of buckles 70 are adjustably attached to the first rear strap 50 and the second rear strap 52. A third rear strap 54 is positionable behind the car seat 16 or the rear seat 13 of the vehicle and is then removably attachable to the first rear strap 50 and the second rear strap 52 as best shown in FIG. 3 of the drawings. The third rear strap 54 is preferably positioned within the channel of the car seat 16 for the seat belt. As shown in FIG. 1, a sheath 60 is preferably provided for inserting the third rear strap 54 through the channel within the car seat 16 by simply inserting the third rear strap 54 into the sheath 60 and then inserting the sheath 60 through the channel of the car seat 16. It can also be appreciated by one skilled in the art that less or more straps may be utilized to attach to the rear end 24 of the support member 20.

Figure 4:
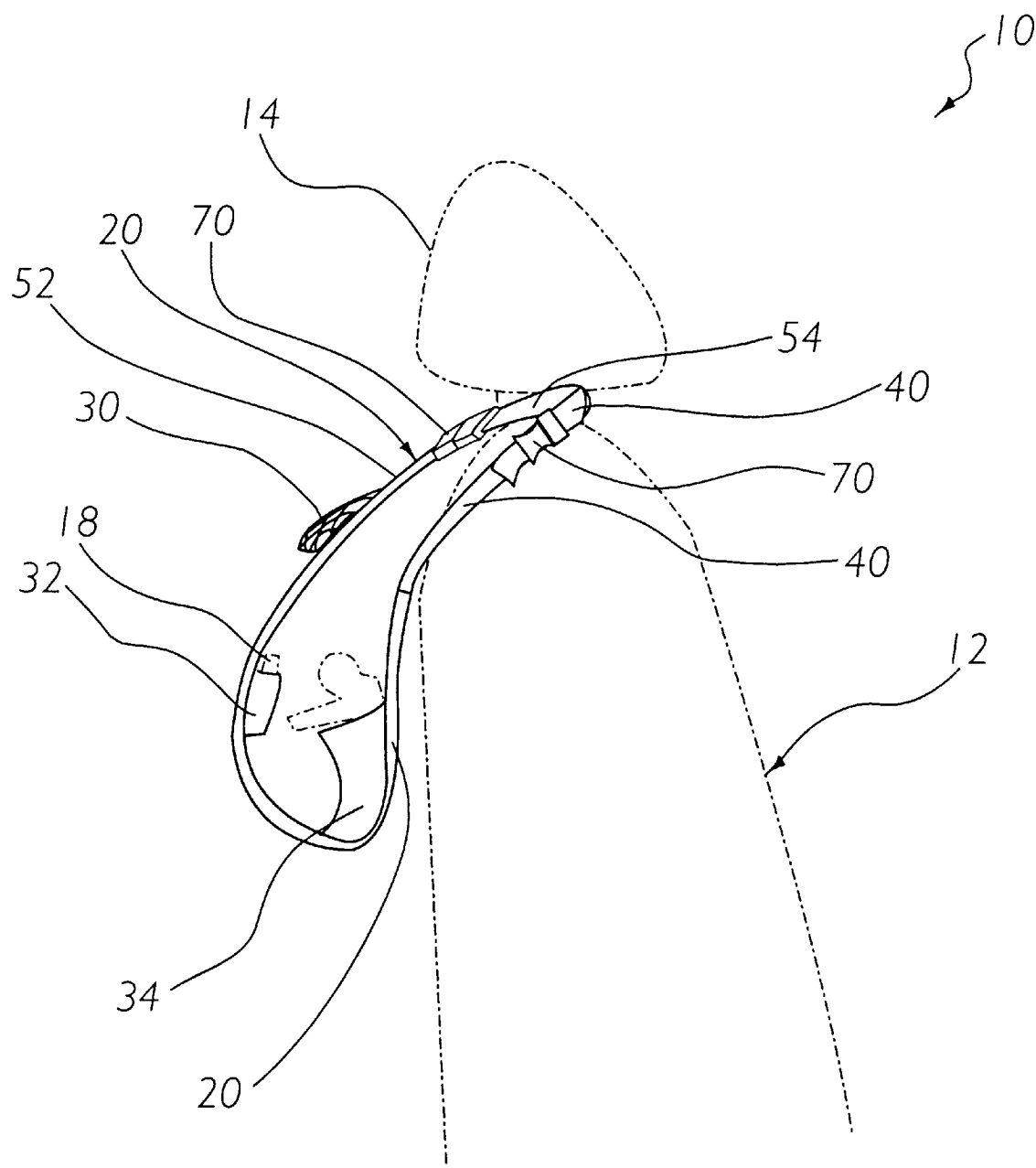
FIG. 4 is a side view of the present invention in the storage position.

In use, the user positions the front strap 40 about the head rest 14 of the front seat 12 and connects the buckle 70. The user then positions the child 19 within the car seat 16 and attaches the necessary seat belt restraints. The third strap is then positioned through the channel of the car seat 16 by utilizing the sheath 60 or other method. The user then grasps the support member 20 to position the rear end 24 of the support member 20 near the child 19 and the car seat 16 as shown in FIG. 3 of the drawings. The pair of buckles 70 are then locked from the first rear strap 50 and the second rear strap 52 to the opposing ends of the third rear strap 54. The support member 20 is now tensioned between the front seat 12 and the car seat 16 so as to position the support member 20 in front of the child 19. The rear end 24 of the support member 20 will form an arcuate shape about the child 19 to provide support along the sides of the child 19 as shown in FIG. 3 of the drawings. The support member 20 slopes downwardly towards the child 19 as shown in FIG. 2 to retain the objects near the child's 19 reach. The parent then places the toys 18 and bottles 15 in the appropriate locations about the child 19 on top of the support member 20. During travel, the items are easily within the child's 19 reach and if an item should be dropped by the child 19, the item will be captured and retained by the support member 20. If the child 19 rolls the object toward the front seat 12, the incline of the support member 20 will roll the object back towards the child 19. The support member 20 also will have a naturally bow or U-shaped cross-section to it thereby preventing objects from rolling off the side portions of the support member 20. When the user desires to retrieve the child 19 from the car seat 16, one of the buckles 70 are released that are attached to the third rear strap 54. The user then is able to removably attached the third rear strap 54 about the head rest 14 of the front seat 12 to position the invention in a storage position as shown in FIG. 4 of the drawings. The toys 18 and other items are stored within the folded support member 20 as shown in FIG. 4 until the user begins traveling again with the child 19.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child object support system for use in a vehicle between a car seat and a front seat for supporting a plurality of objects for a child, comprising:

a support member having a rear end, a front end, a top surface and an aperture near said rear end, wherein said support member supports said plurality of objects;

a cup holder attached to said support member about said aperture, wherein said cup holder is comprised of a netting material for conforming to various shapes and sizes of beverage containers;

a rear attaching means connected to said rear end for removably attaching said support member to said car seat or a head rest;

wherein said rear attaching means is comprised of a first rear strap, a second rear strap and a third rear strap, wherein said third rear strap includes a pair of buckles attached to opposing ends thereof that removably engage corresponding buckles attached to said first rear strap and said second rear strap, and wherein said first rear strap is secured to said rear end and said second rear strap is secured to said rear end of said support member opposite of said first rear strap; and a front attaching means connected to said front end for removably attaching said support member to said head rest.

2. The child object support system of claim 1, wherein said support member is flexible.

3. The child object support system of claim 1, including a plurality of loops attached to said support member for catachably retaining said plurality of objects.

4. The child object support system of claim 3, wherein said plurality of loops are comprised of an elastic material.

5. The child object support system of claim 1, including at least one pocket attached to said support member.

6. The child object support system of claim 1, wherein said support member has an elongated rectangular shape.

7. The child object support system of claim 1, wherein said support member is formed to surround said child in said car seat.

8. The child object support system of claim 1, wherein said support member is comprised of an elastic material.

9. The child object support system of claim 1, wherein said front attaching means comprises at least one strap and at least one buckle means.

10. The child object support system of claim 9, wherein said at least one strap of said front attaching means is attached along said front end of said support member.

11. The child object support system of claim 10, wherein said support member is flexible.

12. The child object support system of claim 11, including at least one loop attached to said support member.

13. The child object support system of claim 12, including at least one pocket attached to said support member.

14. The child object support system of claim 13, wherein said support member has a elongated rectangular shape.

15. The child object support system of claim 14, wherein said support member is comprised of a netting material.

16. A child object support system for use in a vehicle between a car seat and a front seat for supporting a plurality of objects for a child, comprising:

a support member having a rear end, a front end, a top surface and an aperture near said rear end, wherein said support member supports said plurality of objects;

a cup holder attached to said support member about said aperture, wherein said cup holder is comprised of a netting material for conforming to various shapes and sizes of beverage containers;

a plurality of elastic loops attached to said support member for supporting said plurality of objects;

a rear attaching means connected to said rear end for attachment to said car seat or a head rest;

wherein said rear attaching means is comprised of a first rear strap, a second rear strap and a third rear strap, wherein said third rear strap includes a pair of buckles attached to opposing ends thereof that removably engage corresponding buckles attached to said first rear strap and said second rear strap, and wherein said first rear strap is secured to said rear end and said second rear strap is secured to said rear end of said support member opposite of said first rear strap;

a front attaching means connected to said front end for attachment to said head rest;

at least one pocket attached to said support member;

wherein said support member has a elongated rectangular shape;

wherein said support member surrounds said child in said car seat;

wherein said support member is comprised of an elastic material; and an elongate and rigid sheath for receiving said third rear strap for positioning within said car seat.

* * * * *